United States Patent
Tillmann et al.

(10) Patent No.: US 9,193,090 B2
(45) Date of Patent: Nov. 24, 2015

(54) CUTTING MACHINE

(71) Applicant: FECKEN-KIRFEL GMBH & CO. KG, Aachen (DE)

(72) Inventors: Michael Tillmann, Würselen (DE); Helmut Tönnes, Düren (DE)

(73) Assignee: FECKEN-KIRFEL, GMBH & Co. KG, Aachen (DE)

( * ) Notice: Subject to any disclaimer, the term of this patent is extended or adjusted under 35 U.S.C. 154(b) by 0 days.

(21) Appl. No.: 14/352,239

(22) PCT Filed: Oct. 18, 2012

(86) PCT No.: PCT/EP2012/070652
§ 371 (c)(1),
(2) Date: Apr. 16, 2014

(87) PCT Pub. No.: WO2013/057190
PCT Pub. Date: Apr. 25, 2013

(65) Prior Publication Data
US 2014/0251108 A1    Sep. 11, 2014

(30) Foreign Application Priority Data

Oct. 21, 2011   (DE) .................... 10 2011 084 987

(51) Int. Cl.
*B27B 13/10*   (2006.01)
*B26D 1/54*   (2006.01)
*B23D 55/08*   (2006.01)

(52) U.S. Cl.
CPC . *B27B 13/10* (2013.01); *B26D 1/54* (2013.01); *B23D 55/08* (2013.01); *Y10T 83/7089* (2015.04); *Y10T 83/7264* (2015.04)

(58) Field of Classification Search
CPC ...... B23D 53/005; B23D 53/12; B23D 55/08; Y10T 83/7089; Y10T 83/7507; B26D 1/46; B26D 1/48; B26D 1/50; B27B 13/10
USPC ....................... 83/792, 788; 30/369
See application file for complete search history.

(56) References Cited

U.S. PATENT DOCUMENTS

| | | | |
|---|---|---|---|
| 2,843,917 A * | 7/1958 | Crane et al. | 83/797 |
| 2,906,309 A * | 9/1959 | Criner | 83/792 |
| 3,889,564 A * | 6/1975 | Aspinwall et al. | 83/174 |
| 6,199,468 B1 * | 3/2001 | Hackbarth et al. | 83/820 |

FOREIGN PATENT DOCUMENTS

| | | |
|---|---|---|
| DE | 1184069 B | 12/1964 |
| DE | 75 30 595 | 6/1976 |

(Continued)

OTHER PUBLICATIONS

International Search Report dated Jan. 21, 2013 in PCT/EP2012/070652.

*Primary Examiner* — Kenneth E. Peterson
*Assistant Examiner* — Samuel A Davies
(74) *Attorney, Agent, or Firm* — Maier & Maier, PLLC

(57) ABSTRACT

A cutting machine including an endless band knife, the band knife being guided in opposed directions in a revolution zone of the band knife forming a cutting zone, and including a first and a second deflecting device for deflecting and returning the band knife. The first and the second deflecting devices each deflect and return the band knife without a reverse bending cycle.

13 Claims, 2 Drawing Sheets

(56) References Cited

FOREIGN PATENT DOCUMENTS

Figure 4:
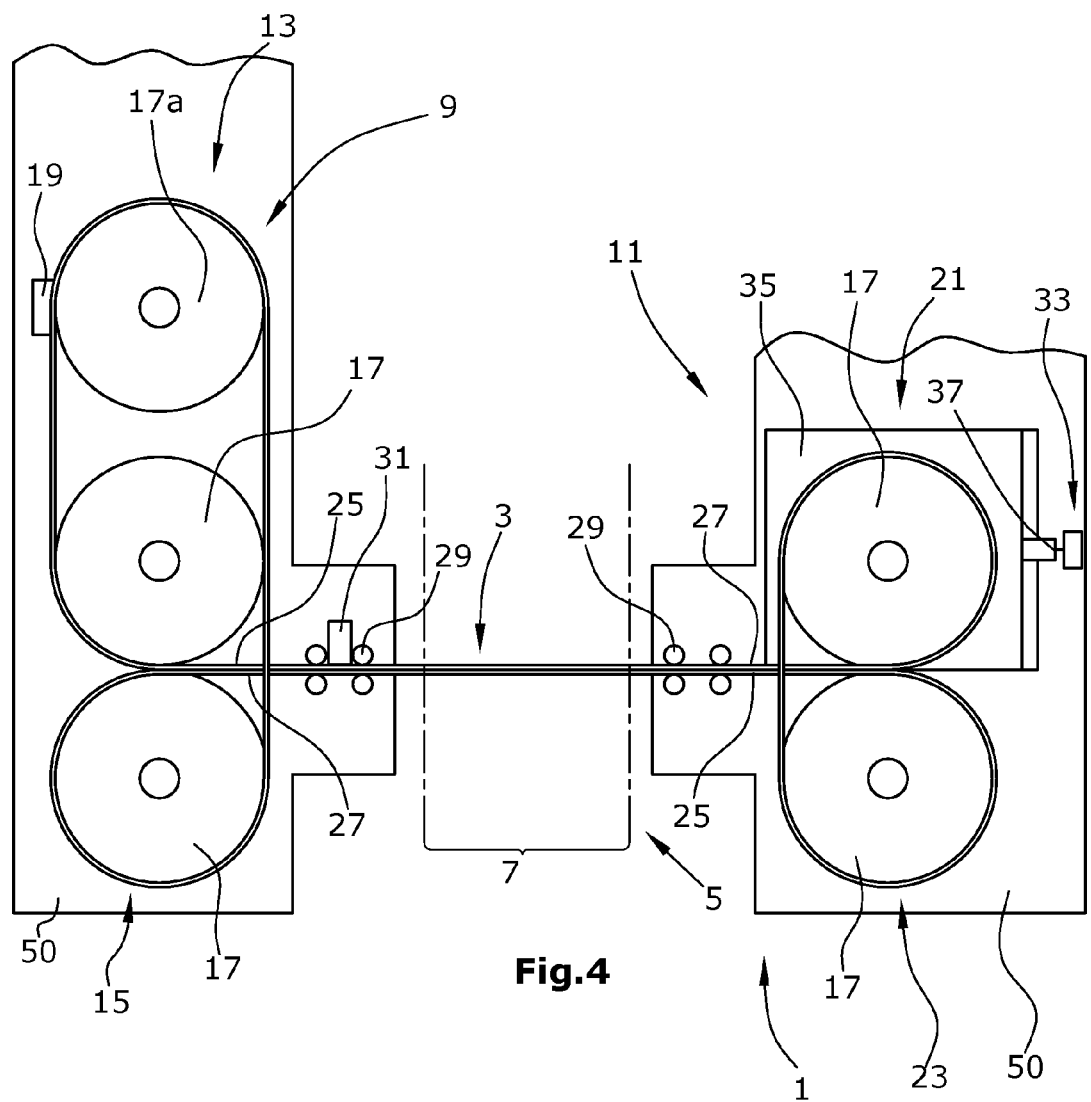

| | | |
|---|---|---|
| DE | 2805156 A1 | 8/1979 |
| DE | 101 29 909 A1 | 1/2003 |
| DE | 202008006710 U1 | 7/2008 |
| GB | 2180439 A | 4/1987 |
| JP | 6182691 A | 7/1994 |
| NL | 8701579 A | 2/1989 |

* cited by examiner

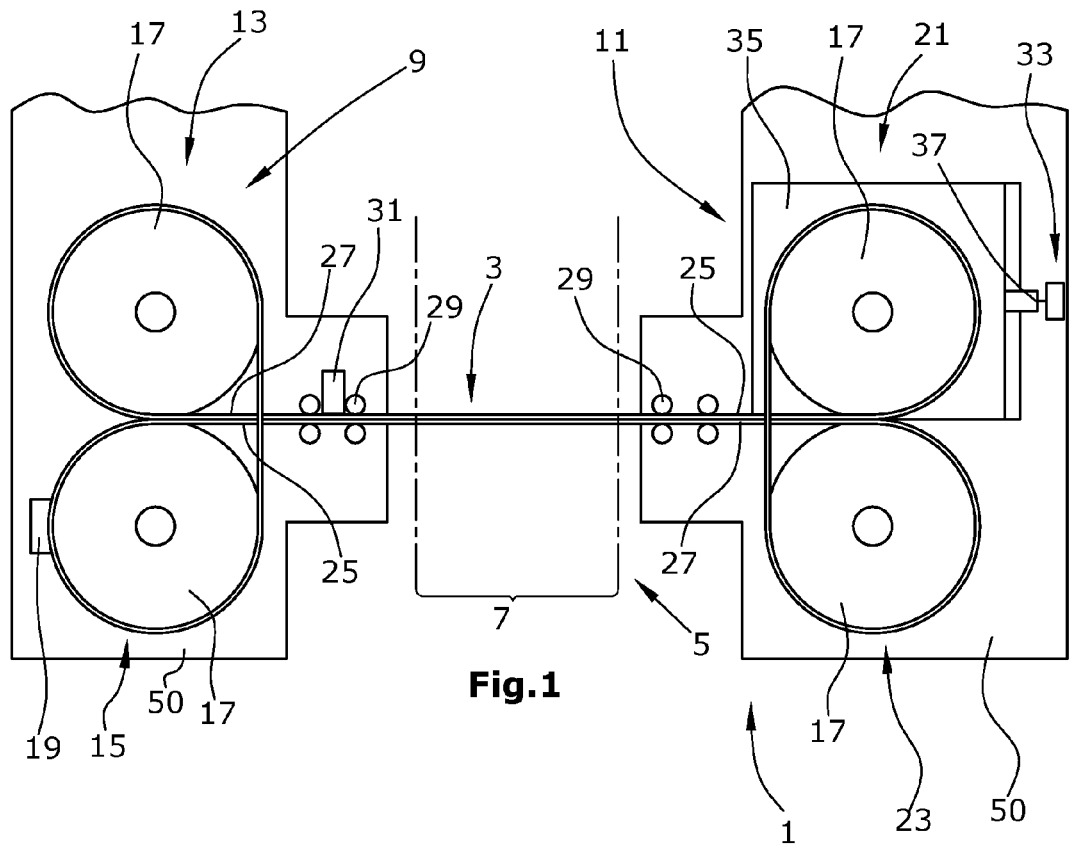
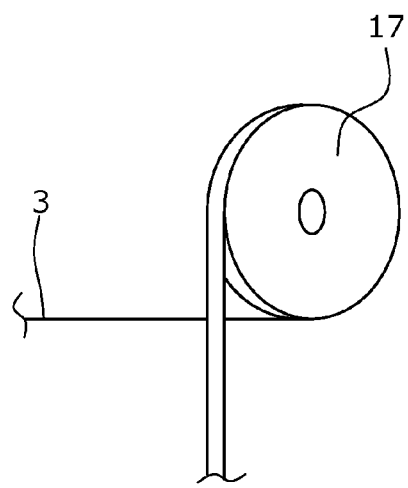
Fig.2
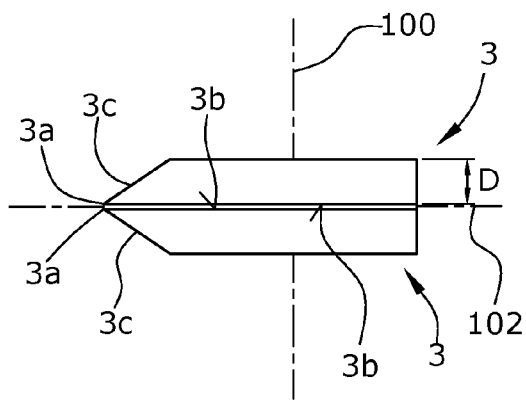
Fig.3

CUTTING MACHINE

Cutting machines, in particular cutting machines for cutting plastic and foamed materials, are faced with ever increasing demands with respect to cutting quality, speed and robustness. The plastic and foamed materials to be cut with the cutting machines become ever heavier and harder or resistant to crushing. Examples of materials to be cut are not only found in the field of comfort foam, such as with mattresses or furniture, for example, but hard and semi-hard PU, PE or PS foams also have to be cut, these foamed materials finding their application in insulations for buildings, refrigerators or vehicles.

For several years, band knife machines are used to cut and severe foamed materials etc. The band knives run over a plurality of knife deflecting pulleys and span freely in a cutting zone for a length of up to 2.5 m. Such a cutting machine is known, for example, from the applicant's documents DE 11 84 069 or DE 75 50 595. With such cutting machines, however, it is necessary to return the band knife above the material so that a large frame is required for the circulating band knife. A cutting machine is known from DE 101 29 909, in which the band knife is twisted by means of a knife rotating head, so as to perform contour cutting.

It is further known that cutting machines may use knives guided in opposed directions. These are advantageous in that a particularly advantageous cutting becomes possible, since the arrangement of the knives in opposed directions results, seen on a microscopic level, in a tearing of the material, where the arrangement in opposed directions allows effecting the tearing at twice the speed of a knife guided in a single direction.

Band knives guided in opposed directions are known, for example, from JP 06182691 and DE 101 29 909 A1.

Some known cutting machines with knives guided in opposed directions have a problem that contour cutting is difficult to perform with these, since, due to the type of knife guiding, a large part of the machine would have to be taken along as the cutting portion of the knife is turned. Turning only the cutting portion of the band knife, as described above, is not possible with a double band knife, since the band knives would become offset with respect to each other if they were twisted.

For the cutting machine known for example from DE 101 29 909 A1, it has been found, however, that the service life of the knives is relatively short due to the great stress in the guiding means.

Therefore, it is an object of the present invention to provide a cutting machine having an endless band knife, in which the band knife is guided in opposite directions in a cutting zone of the band knife, the guiding means or devices being adapted to be realized with little technical effort regarding devices, and, at the same time, a long service life of the band knife is possible.

The cutting machine of the present invention comprises an endless band knife, the band knife being guided in opposed directions in a revolution section of the band knife forming a cutting zone. Thus, the sections of the band knife guided in opposed directions together make a cut. Further, the cutting machine comprises a first and a second deflecting means or devices that deflect and return the band knife. The invention is characterized in that the first and the second deflecting means deflect and return the band knife without a respective reverse bending cycle. In other words: in the first and the second deflecting means, the band knife is deflected and returned exclusively by single bending cycles. Here, single bending cycle means a bending of the band knife in only one direction so that the band knife is stressed only by a dynamic bending load. For example, in a single bending cycle, a band knife is deflected from a straight course to a bent course and back to a straight course. As opposed thereto, in a reverse bending cycle, a band knife is first bent, then runs straight, and is thereafter bent in the opposite direction. A reverse bending cycle has been applied, for example, to the endless band knife in DE 101 29 909 A1.

It has been found recently that such a reverse bending cycle causes very high stress on a band knife so that the band knife may break prematurely. Therefore, the service life of band knives is rather short. The cutting machine of the present invention provides that the deflecting means deflects and returns the band knife without a reverse bending cycle. Thereby, the stress on the band knife is low and the service life of the band knife can be extended substantially compared to prior art. When guided without reverse bending cycles, i.e. only with single bending cycles, individual portions in the cross section of the band knife are exclusively compressed and relaxed again. Other portions of the cross section are exclusively stretched and relaxed again. As opposed thereto, in a reverse bending cycle, both above mentioned portions are both compressed and stretched. This results in a premature material fatigue and in a rupture of the band knife.

Moreover, by providing first and a second deflecting means, the cutting machine of the present invention can be realized with a very compact structure which, above that, can be realized with little technical effort with respect to devices.

The invention may further provide that the band knife is guided without a reverse bending cycle during a full revolution. In other words: in the first and the second deflecting means, the band knife is always bent only in the same direction.

In a preferred embodiment of the invention it is provided that the first and second deflecting means each comprise a first knife pulley device and a second knife pulley device. By realizing the first and second deflecting means as knife pulley devices, it is possible to deflect and return the band knife in a particularly simple manner by deflecting the band knife by means of the knife pulleys of the knife pulley device. Further, a knife pulley allows for a particularly simple drive of the band knife. Each knife pulley device can comprise at least one knife pulley. Of course, it is also possible that a knife pulley device comprises more than one knife pulley.

In a particularly preferred embodiment of the invention it is provided that the first and second knife pulley devices respectively guide the band knife in the deflection direction past the knife strand fed to the deflecting means and the knife strand leaving the deflecting means. Thus, in the region immediately adjacent the deflecting device, the band knife is guided in opposed directions and forms the knife strand fed to the deflecting means and the knife strand leaving the deflecting means. Within the deflecting means, the first and second knife pulley devices guide the knife past this region. In order to achieve this, the invention may provide that the first and second knife pulley devices realize an offset in the path of the band knife in order to guide the band knife past the knife strand. It has been found that such a guiding of the band knife—as opposed to the stress caused by a reverse bending cycle—causes only little stress to the band knife so that the service life of the band knife is not influenced at all or only to a minor degree. Thus, the cutting machine of the present invention can allow in a simple manner that the band knife is deflected and returned without a reverse ending cycle.

In an embodiment of the invention it is provided that each knife pulley device comprises at least one knife pulley. Of course, it is also possible that a knife pulley device comprises more than one knife pulley. In a preferred embodiment each knife pulley device comprises one knife pulley so that each deflecting means has two knife pulleys. The band knife can be deflected in a particularly advantageous manner by the knife pulleys. Moreover, the band knife can be driven in an advantageous manner by means of a knife pulley.

It may be provided that at least one knife pulley of each knife pulley device is tilted with respect to a principal plane extending perpendicularly to the cutting plane. Thereby, it is possible to advantageously achieve the offset necessary for leading the band knife past the knife strand fed to the deflecting means and the knife strand leaving the deflecting means, respectively. By tilting the knife pulley, the band knife guided along the knife pulley is twisted slightly. In one embodiment of the invention, in which each knife pulley device comprises one knife pulley, the knife strand fed to the deflecting means is guided past the knife strand fed to the deflecting means or the knife strand leaving the deflecting means by the knife pulley of the first knife pulley device and is returned to the knife strand leaving the deflecting means by the knife pulley of the second knife pulley device. Here, the knife pulley of the first knife pulley device is tilted in a direction opposite to the knife pulley of the second knife pulley device. The band knife wraps each of the knife pulleys over a wrap angle of about 270°. In the context of the invention, the principal plane is the plane that is perpendicular to the cutting plane and also perpendicular to the cutting direction.

In one embodiment of the invention it is provided that the side faces of the band knife contact each other in the cutting zone. In other words: in the cutting zone, the side faces of the band knife guided in opposed directions slide along each other. Thereby, it is possible to make a particularly fine cut with the cutting machine of the invention.

In an embodiment of the invention it may be provided that a knife guide is provided upstream and/or downstream of the cutting zone. Using the knife guide, the cutting quality can be enhanced, since the band knife is supported on the knife guide during the cutting operation and oscillations of the band knife as well as movements of the band knife during the cutting operation can thereby be reduced. Further, the knife guide guarantees that the flanks of the band knife contact each other in the cutting zone so that a very fine cut can be made.

According to the invention it may be provided that the band knife has a cutting edge chamfered on one side, preferably a toothed cutting edge. Due to the arrangement in opposed directions, the band knife with the cutting edge chamfered on one side forms a cutting edge chamfered on both sides in the cutting zone. Thereby, a particularly high cutting quality can be achieved.

In a particularly preferred embodiment of the invention it is provided that at least one sharpening apparatus is arranged in the revolution path of the band knife. Using the sharpening apparatus, the band knife can constantly be sharpened during a cutting operation so that a largely constant high cutting quality can be achieved.

In this context it may be provided that the sharpening apparatus is arranged in the revolution section. This has the advantage that the sharpening apparatus does not influence the deflection of the band knife. Further, the sharpening apparatus is thus arranged immediately upstream of the cutting zone so that the band knife can be sharpened immediately before the cutting operation.

In an embodiment of the invention it is provided that the sharpening apparatus sharpens only one chamfer of the band knife guided in opposed directions. Thus, the chamfer of the band knife is sharpened only once in one cycle. This has the advantage that the chamfer of the band knife is always sharpened by the same sharpening apparatus so that the band knife portions guided in opposed directions have exactly the same chamfer length and the same chamfer angle, respectively. Thereby, the band knife portions guided in opposed directions form a symmetrical cutting edge, whereby a particularly high cutting quality can be achieved.

In the cutting machine of the present invention it may further be provided that the first and the second deflecting means are arranged on a common frame that is supported in a pivotable manner. Thus, a contour cut can be made by pivoting the entire band knife with the first and second deflecting means.

The invention advantageously provides that at least one knife pulley device comprises a drive. In this context it may be provided that one knife pulley of the knife pulley device is driven by this drive. In particular, it is provided that only a single knife pulley of the entire cutting machine is driven. Thereby, it is avoided that an asynchronous drive of a plurality of knife pulleys causes stress on the band knife or causes oscillations during the circulation of the band knife.

In one embodiment of the invention it is provided that at least one knife pulley device comprises a tensioning device. The tension of the band knife can be adjusted by means of the tensioning device. Thus, the tension of the band knife can be adjusted to the material to be cut, and it is also possible to compensate for knife tensions that vary due to thermal expansion. It is further possible that several knife pulleys of the knife pulley devices respectively comprise one tensioning device, the tensioning device allowing for a displacement of the knife pulleys in the principal plane. Of course, it is possible that several knife pulleys of two different knife pulley devices can share a tensioning device. Preferably, it is provided that only those knife pulleys that are not equipped with a drive comprise a tensioning device.

The following is a detailed description of the invention with reference to the accompanying drawings.

In the Figures:

FIG. 1 is a schematic illustration of a first embodiment of a cutting machine according to the present invention, FIG. 2 schematically illustrates a detail of a knife pulley of the cutting machine shown in FIG. 1, FIG. 3 is a schematic sectional view of the band knife guided in opposed directions, and FIG. 4 is a schematic illustration of a second embodiment of a cutting machine according to the present invention.

FIG. 1 is a schematic top plan view on a cutting machine 1 of the present invention.

The cutting machine 1 comprises a band knife 3 that is guided in an endless manner. The band knife 3 is guided in opposed directions in a revolution section 5 that forms a cutting zone 7.

The cutting machine 1 comprises a first deflecting means 9 and a second deflecting means 11 by which the band knife 3 is deflected and returned, respectively. The band knife 3 is deflected and returned by the first and second deflecting means 9, 11 without a reverse bending cycle. In other words: in the deflecting means 9, 11, the band knife 3 is subjected only to single bending cycles, respectively.

The first deflecting means 9 comprises a first knife pulley device 13 and a second knife pulley device 15. The first knife pulley device 13 and the second knife pulley device 15 each comprise one knife pulley 17 around which the band knife 3 is guided. The knife pulley 17 of the second knife pulley device 15 is driven by a drive 19. Thus, in the embodiment illustrated in FIG. 1, the band knife 3 is driven in an endless manner via the knife pulley 17 of the first knife pulley device 13.

The second deflecting means 11 comprises a first knife pulley device 21 and a second knife pulley device 23, which each also comprise one knife pulley 17.

When the band knife 3 is deflected and returned in the first deflecting means 9, the knife strand 25 fed to the deflecting means 9 in the direction of revolution is first deflected by the knife pulley 17 of the second knife pulley device 15.

The knife pulleys 17 of the first and second knife pulley devices 13, 15, 21, 23 are arranged tilted with respect to a principal plane. The tilted arrangement is schematically illustrated in FIG. 2, for example. The principal plane 100 is perpendicular to cutting plane 102 formed by the band knife 3 in the cutting zone 7 and is also perpendicular to the cutting direction. The principal plane 100 and the cutting plane 102 are schematically illustrated in FIG. 3, in which the band knife 3 is illustrated schematically in section in the cutting zone 7, where it is guided in opposed directions.

Due to the tilted arrangement of the knife pulley 17 of the second knife pulley device, the band knife 3 is slightly offset so that the band knife no longer runs in the principal plane 100. Thereby, the band knife 3 can be guided past the knife strand 25 fed to the first deflecting means 9 and the knife strand 27 leaving the first deflecting means 9, respectively. Thereafter, the band knife 3 is again deflected by the knife pulley 17 of the first knife pulley device 13 and is fed into the knife strand 27 leaving the deflecting means.

The band knife runs around the knife pulleys 17 of the first and second knife pulley devices 13 and 15 with a respective wrap angle of approximately 270°. The band knife 3 is deflected and returned on a second deflecting means 11 in the same manner.

Upon deflection by the knife pulley 17 of the second knife pulley device 15, the band knife 3 is deflected from a straight path into a certain direction and is guided in a straight path again after it has left the knife pulley device 15. Upon deflection by the knife pulley 17 of the first knife pulley device 13, the previous straight path is also bent and is again guided as a straight path after having left the knife pulley 17. Here, the bending is in the same direction as the above-mentioned bending.

In the cutting machine of the invention, the band knife 3 is exclusively subjected to single bending cycles in the same direction and is only additionally subjected to a torsional stress. It has been found that, with such a type of guiding, the band knife 3 is exposed to substantially less stress than with a guiding using reverse bending cycles.

The cutting machine 1 of the present invention further comprises two knife guides 29 arranged upstream and downstream of the cutting zone 7, respectively. Using the knife guide 29, the band knife 3 can be supported laterally of the cutting zone 7, whereby the cutting quality can be enhanced. The band knife 3 can be supported on the knife guide during the cutting operation, so that oscillations and movements of the band knife 3 during the cutting operation can be avoided.

Further, the cutting machine 1 comprises a sharpening apparatus 31 that sharpens the band knife 3 during operation. In the embodiment illustrated in FIG. 1, the sharpening apparatus 31 is integrated in one of the knife guides 29.

As is best seen in FIG. 3 the band knife 3 has a cutting edge 3a chamfered on one side. The cutting edge 3a may also be toothed, for example. In the circulation zone 5 forming the cutting zone 7, the band knife 3 is guided in opposed directions such that the lateral faces 3b that are not provided with the chamfers 3c forming the cutting edge 3a are in abutting contact with each other. Thereby, due to the knife being guided in opposed directions, the band knife 3 acts like a knife in the cutting zone 7 that has a cutting edge chamfered on both sides. Due to the fact that the lateral faces 3b abut on each other, the overall thickness of the band knife guided in opposed directions is kept as small as possible so that a fine cut is possible.

Using a toothed knife has the advantage that the opposed guiding results in a scissors-like effect between the individual teeth in the cutting zone, whereby a particularly advantageous cutting result can be achieved.

The sharpening apparatus 31 sharpens the chamfer 3c of the band knife 3 once per revolution. Thus, it can be ensured that the chamfer 3c of the band knife 3 guided in opposed directions in the cutting zone 7 has exactly the same chamfer angle and the same chamfer length throughout. This allows for a very precise cut, since a symmetrical cutting edge is formed.

FIG. 2 schematically illustrates the tilted position of one of the knife pulleys 17 with respect to the principal plane 100. Here, the principal plane 100 is the plane of the drawing. In the embodiment of the cutting machine illustrated in FIG. 1, all knife pulleys 17 are tilted with respect to the principal plane 100, with the knife pulleys 17 of one of the deflecting means 9, 11 being tilted in opposed directions, respectively, so that the band knife 3 is offset out from the principal plane 100 by a respective knife pulley, whereas the other knife pulley leads the band knife back onto the principal plane 100.

In the embodiment of a cutting machine 1 of the present invention illustrated in FIG. 1, the first knife pulley device 21 of the second deflecting means 11 further comprises a tensioning device 33 by which the tension of the band knife 3 can be changed. For this purpose, the knife pulley 17 of the first knife pulley device 21 is supported on a movable plate 35 that can be moved by means of a pneumatic cylinder 37.

Of course, it is also possible that the knife pulleys 17 of the second knife pulley device 23 of the second deflecting means 11 or the knife pulley device 15, 17 of the first deflecting means 9 comprise a corresponding tensioning device. It is also possible that, for example, the knife pulleys 17 of the first and second knife pulley devices 21, 23 are arranged on a movable plate together and comprise a common tensioning device. In the embodiment illustrated in FIG. 1, the tensioning device 33 is arranged such that the knife pulley 17 can be moved in the principal plane 100 in a direction parallel to the cutting plane 102. Of course, it is also possible that the knife pulley is adjusted in the principal plane 100 in a direction perpendicular to the cutting plane 102.

The first and second deflecting means 9, 11 are further arranged on a frame 50. By means of the frame 50, the cutting device may be adjustable for example, in all directions by moving the entire frame in the corresponding direction. It may further be provided that the frame 50 is also pivotable so that a contour cut is possible with the cutting machine 1 of the present invention. Here, the entire band knife is pivoted by means of the frame 50 together with the first and second deflecting means 9, 11. In particular when the cutting machine 1 of the present invention is used as a contour cutting machine, the arrangement according to the invention is particularly advantageous, since the weight to be pivoted during the contour cutting operation can be kept relatively low because of the low technical effort regarding the devices.

FIG. 4 schematically illustrates a second embodiment of a cutting machine 1 of the present invention. The embodiment illustrated in FIG. 4 substantially corresponds to the embodiment illustrated in FIG. 1 with the modification that the first knife pulley device 15 of the first deflecting means 9 is formed by a knife pulley 17 and a second knife pulley 17a. In the embodiment illustrated in FIG. 4, the drive 19 is arranged at the second knife pulley 17a. This is advantageous in that the driven knife pulley 17a does not have to be tilted with respect to the principal plane 100. This may reduce the stress on the knife materials in some applications.

It has further been found that the diameter of the knife pulleys 17 has an effect on the service life of the band knife, since too large an offset of the band knife 3 per unit knife length is created when the pulleys are too small. It has been found in this context that a ratio of the thickness D of the band knife 3 to the diameter of the knife pulleys 17 between 1:500 and 1:1000 is particularly advantageous.

The cutting machine 1 of the present invention can be used in various applications. For example, the cutting machine may be a horizontal cutting machine or a vertical cutting machine. For a horizontal cutting machine, the knife pulleys 17 would be arranged substantially as illustrated in FIGS. 1 and 4. In a vertical cutting machine that has a horizontal cutting direction, the arrangement would be rotated substantially through 90° with respect to the arrangement illustrated in FIG. 1 and FIG. 4. In a vertical cutting machine that is to cut in a vertical cutting direction, the knife pulleys 17 would be arranged lying substantially horizontally.

In one embodiment, in which the cutting machine 1 of the invention is designed as a contour cutting machine, the entire device is pivoted by means of the frame 50 so that a cut can be made in the vertical and the horizontal direction.

The cutting machine of the present invention allows cutting plastic and foamed materials in a particularly advantageous manner. However, the cutting machine is not restricted to such materials.

Preferred plastic and foamed materials are materials used in the field of comfort foams finding their application in mattresses or furniture, for example, but also hard and semi-hard PU, PE or PS foamed materials, as well as composite foamed materials which, as a recycling product, uses waste material, for example.

The invention claimed is:

1. A cutting machine comprising an endless band knife, the band knife being guided in opposed directions in a revolution zone of the band knife to form a cutting zone, and comprising a first and a second deflecting device that respectively deflects and returns the band knife, wherein the first and the second deflecting devices each deflect and return the band knife without a reverse bending cycle; and wherein in the cutting zone, a first portion and a second portion of the band knife run in parallel and lateral faces of the first portion and the second portion contact each other in the cutting zone.

2. The cutting machine of claim 1, wherein the band knife is guided without any reverse bending cycle throughout the full revolution of the band knife.

3. The cutting machine of claim 1, wherein the first and the second deflecting devices each comprises a first knife pulley device and a second knife pulley device.

4. The cutting machine of claim 3, wherein, the respective deflecting devices, the first and the second knife pulley devices each guide the band knife past the knife strand fed to the deflecting devices and the knife strand leaving the deflecting devices.

5. The cutting machine of claim 3, wherein each knife pulley device comprises at least one knife pulley.

6. The cutting machine of claim 5, wherein at least one knife pulley of each knife pulley device is tilted with respect to a principal plane that is perpendicular to a cutting plane.

7. The cutting machine of claim 3, wherein at least one of the knife pulley devices comprises a drive.

8. The cutting machine of claim 1, wherein a knife guide is arranged upstream and downstream of the cutting zone.

9. The cutting machine of claim 1, wherein the band knife comprises a cutting edge chamfered on one side.

10. The cutting machine of claim 1, wherein at least one sharpening apparatus is arranged in the revolution zone of the band knife.

11. The cutting machine of claim 10, wherein the sharpening apparatus is arranged to sharpen a chamfer of the band knife guided in opposed directions.

12. The cutting machine of claim 1, wherein the first and the second deflecting devices are arranged on a common frame that is supported for pivoting movement.

13. The cutting machine of claim 1, wherein at last one of the knife pulley devices comprises a tensioning device.

\* \* \* \* \*